S. LAPOF

Feb. 9, 1932. PARTITION BLOCK Re. 18,349

Original Filed Oct. 13, 1930

Samuel Lapof

INVENTOR

BY Isaac Shiller

ATTORNEY

Reissued Feb. 9, 1932

Re. 18,349

UNITED STATES PATENT OFFICE

SAMUEL LAPOF, OF BROOKLYN, NEW YORK, ASSIGNOR TO BAR-RAY PRODUCTS, INC., OF NEW YORK, N. Y., A CORPORATION

PARTITION BLOCK

Original No. 1,815,921, dated July 28, 1931, Serial No. 488,248, filed October 13, 1930. Application for reissue filed November 6, 1931. Serial No. 573,486.

This invention relates to devices impervious to X-rays, and which may be utilized as a protection against the injurious effects of such radiation.

Protection against X-rays is a necessity for all persons in proximity to apparatus emitting such rays. Heretofore, protective construction has included the use of lead almost exclusively in complicated, cumbersome, uneconomical and frequently inefficient forms.

It is an object of this invention to provide a partition block which is impervious to X-rays, at the same time being economical and of such a shape as to facilitate its handling.

A further object is the provision of partition blocks which may be assembled to produce a partition having the usual outward appearance, at the same time being completely impervious to X-rays.

These and other objects are attained by the novel construction, combination and arrangements of parts hereinafter described and shown in the accompanying drawings, constituting a material part of this disclosure, and in which Fig. 1 is a perspective view of a partition block embodying the invention.

Figure 1:
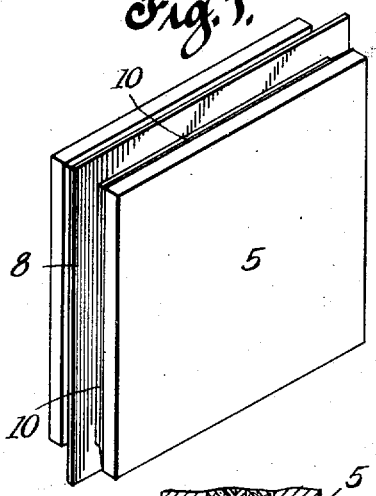

Referring to the drawings, in Fig. 1, the partition block is shown to include a pair of slabs 5, which may be made of gypsum, concrete, or the like. Each slab has a centrally positioned substantially rectangular recess in which is placed a fibrous material 9, such as celotex, or the common types of fiber boards. The slabs are separated by a sheet of lead 7, which is secured to the fibrous material 9 by an adhesive.

Figure 3:
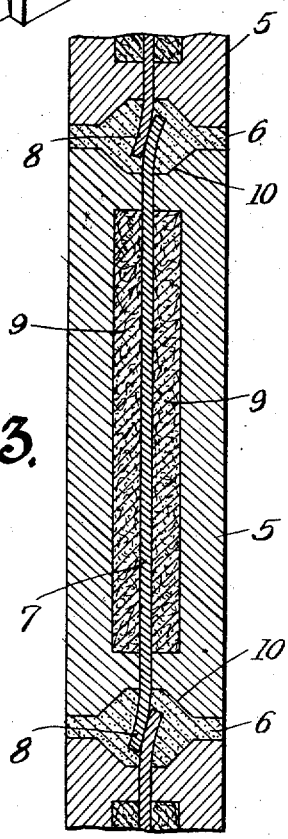
Fig. 3 is a sectional view taken on line 3—3 of Fig. 2.

As shown in Fig. 3, the edges of the sheet of lead 7 project beyond the edges of the slabs to provide flaps 8, and the edges of the slabs are grooved at 10. By means of this arrangement, a block may be joined to another block by mortar 6, and the flaps 8 of the adjacent blocks overlie each other to provide a continuous lead surface to prevent the passage of X-rays, the grooves 10 allowing the flaps 8 the freedom of movement necessary to such a purpose.

Figure 2:
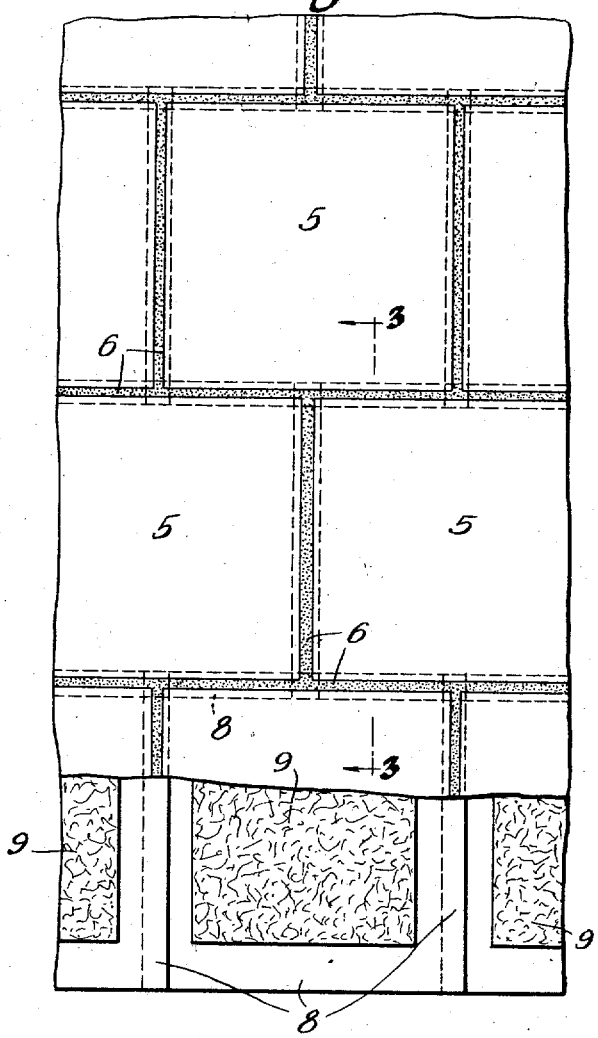
Fig. 2 is an elevational view of a partition or wall formed from blocks embodying the invention.

A partition may be readily constructed with blocks of the type described to produce a wall of common outward appearance such as shown in Figure 2, which wall is at the same time absolutely impervious to X-rays.

Heretofore, lead sheets have been attached to concrete or gypsum by means of projections or loops embedded in the concrete. By means of my invention, such construction of lead sheets is not necessary and by attaching the lead sheets by means of an adhesive the cost of producing the block is materially reduced.

I have found a casein adhesive to be especially adapted for the purpose set forth. Such an adhesive is described in pages 143 to 149, of the book, "Casein" by E. L. Tague, published 1926 by D. Van Nostrand Co., No. 8 Warren St., New York, N. Y.

While I have described the block as having two slabs, it is obvious that only one slab may be used without affecting the usefulness of the block, and without departing from the spirit of my invention.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described the invention, what is claimed as new and desired to protect by Letters Patent, is:

1. A block for use in constructing a wall impervious to X-rays, comprising a pair of slabs of gypsum or concrete, each slab having a central recess in which is positioned a fibrous material, and a lead sheet secured to the fibrous material by adhesive and separating the slabs, the edges of the lead sheet projecting beyond the edges of the block.

2. A block for use in constructing a wall impervious to X-rays, comprising a pair of slabs having fibrous material attached to their adjacent faces and a lead sheet separating the slabs, said sheet being attached to the fibrous material by means of an adhesive.

3. A block for use in constructing a wall impervious to X-rays, comprising a pair of slabs having their adjacent faces bevelled to form grooves, and a lead sheet, positioned between and attached to the slabs, the edges of the sheet projecting beyond the edges of the slabs.

4. A block for use in constructing a wall impervious to X-rays, comprising a slab having fibrous material attached to one of its faces, and a lead sheet, said lead sheet being attached to the fibrous material by means of an adhesive.

5. A device for constructing a surface impervious to X-rays, comprising a slab of fibrous material and a lead sheet, said lead sheet being attached to the fibrous material by means of an adhesive.

In testimony whereof he has affixed his signature this 15th day of October, 1931.

SAMUEL LAPOF.